Figure 1:
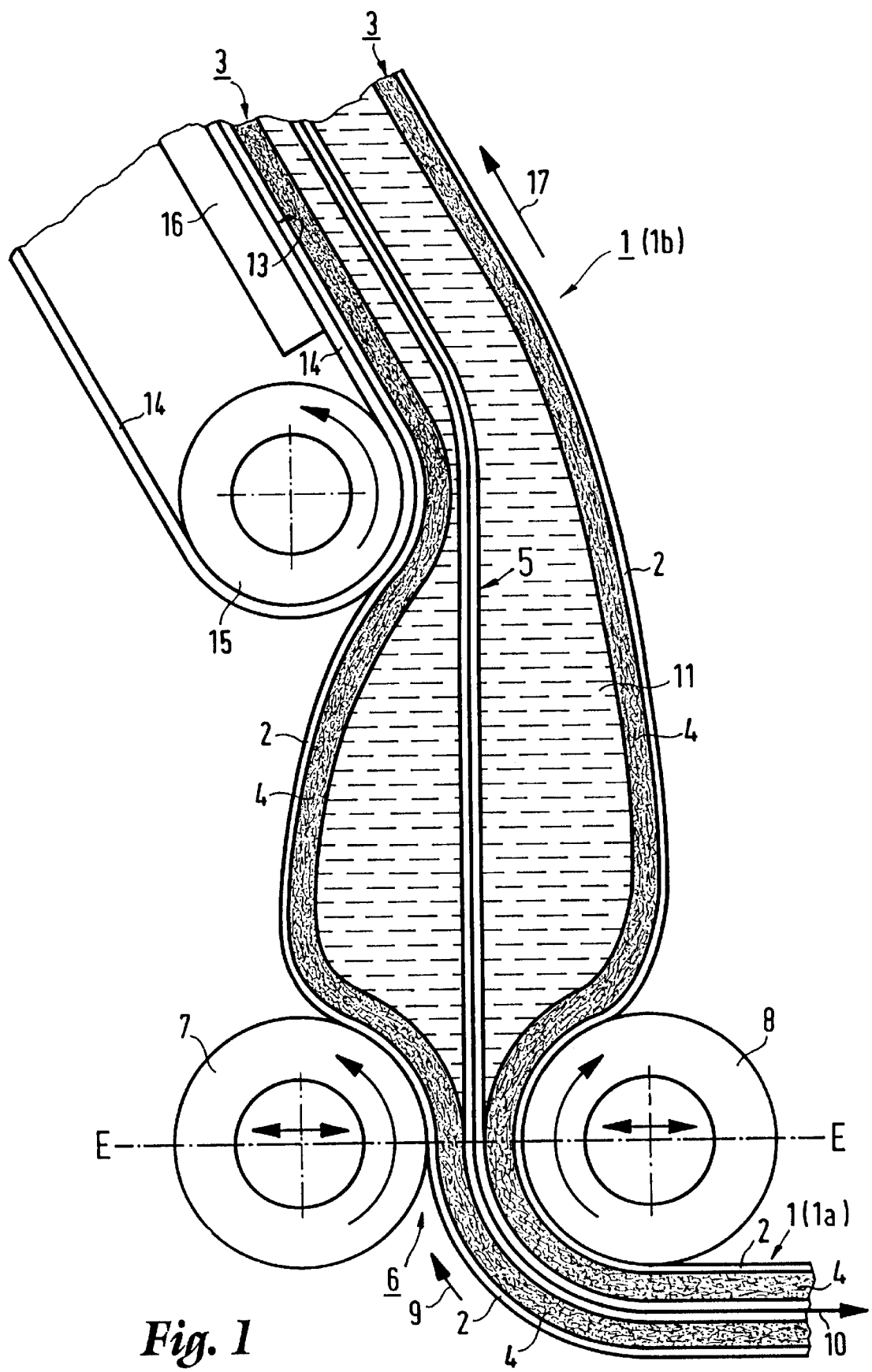

United States Patent

Henze

[11] Patent Number: 5,846,602
[45] Date of Patent: Dec. 8, 1998

[54] PROCESS AND DEVICE FOR THE PRODUCTION OF A TUBE FOR LINING PIPE CONDUITS AND SEWER SYSTEMS

[75] Inventor: Michael Henze, Waldems, Germany

[73] Assignee: Rothenberger Rorhsanierung GmbH Industriestrasse 7, Germany

[21] Appl. No.: 743,615

[22] Filed: Nov. 4, 1996

[30] Foreign Application Priority Data

Sep. 17, 1996 [DE] Germany .................. 196 37 795.1

[51] Int. Cl.⁶ .................................................. B05D 7/22
[52] U.S. Cl. .................... 427/238; 427/230; 427/294; 427/296; 427/345.5; 427/393.5; 427/434.2; 427/434.4; 427/412.2
[58] Field of Search .................................. 427/230, 294, 427/296, 385.5, 395.5, 434.4, 434.2, 412.2, 238

[56] References Cited

U.S. PATENT DOCUMENTS

| | | | |
|---|---|---|---|
| 4,009,063 | 2/1977 | Wood | 156/71 |
| 4,353,939 | 10/1982 | Becker et al. | 427/230 |
| 4,353,940 | 10/1982 | Becker et al. | 427/230 |
| 4,357,371 | 11/1982 | Heinrich et al. | 427/230 |

FOREIGN PATENT DOCUMENTS

| | | |
|---|---|---|
| 0 301 204 | 2/1989 | European Pat. Off. . |
| 22 40 153 | 5/1973 | Germany . |
| 35 46 417 | 7/1987 | Germany . |

*Primary Examiner*—Janyce Bell
*Attorney, Agent, or Firm*—Nixon & Vanderhye

[57] ABSTRACT

In the production of a transportable, multilayery tube (1) with a gas-impermeable outer layer (2) and at least one layer (3) impregnated with a curable resin (11) and made of a composite fiber material (4) to line pipe conduits and sewer systems, using subatmospheric pressure and rollers (7,8) between which is formed at least one nip (6) through which to feed tube (1), to even out and accelerate the impregnation, at first still unimpregnated tube (1) is fed from below into nip (6) and air is evacuated from unimpregnated section (1a) of tube (1). In doing so, liquid resin (11) is brought into full opening (1d), at first still open, of tube (1) and is dammed up by nip (6). Then tube (1) is taken off nip (6) with an upward-oriented component at such a speed that the border between impregnated and unimpregnated sections (1a or 1b) of tube (1) is essentially retained in the area of nip (6), and that then tube (1) finally is taken off through at least one other nip (36, 38, 39) and collected on a transport device (30).

7 Claims, 4 Drawing Sheets

PROCESS AND DEVICE FOR THE PRODUCTION OF A TUBE FOR LINING PIPE CONDUITS AND SEWER SYSTEMS

The invention relates to a process for the production of a transportable, multilayer tube with a gas-impermeable outer layer and at least one layer impregnated with a curable resin and made of a composite fiber material for lining pipe conduits and sewer systems, using subatmospheric pressure and rollers, between which is formed at least one nip for the tube to pass through.

Such tubes are designated also as "liners." Their production and their installation in the renovation of pipe conduits and sewer systems are complicated and time-consuming, and specifically especially when the production and processing of longer-length tubes are involved. The main element, after the curing, is the tube-shaped closed layer made of the impregnated composite fiber material. To achieve great strength, the resin or the composite fiber material must be, in any way possible, free of voids that can occur due to inclusions of air but also by insufficient impregnation of the composite fiber material. The curing of the resin can be performed either by heat, visible light or ultraviolet light. For this purpose, a whole series of resin materials are available commercially that can be mixed with activators and accelerators to accelerate the curing. Cold-curing resins are also known in which the curing is introduced on a delayed basis.

Such tubes or liners can be used in the field of renovation, for example, in the flat state and, after the attachment of so-called end closures, be expanded by a medium under pressure and pressed against the walls to be renovated. Another method of inserting the tube or liner consists in so-called turning inside out or eversion. In both cases, for the purpose of handling the tube, the impregnated composite fiber material is surrounded on the outside by a gas-impermeable outer layer made of a tube-shaped film, which of course is also resin-proof. When such a tube is inflated, this outer film now comes into contact with the wall surface to be renovated, and the impregnated composite fiber material is on the inside. Now to be able to move sources of radiation through such an inflated tube for curing, a tube-shaped inner film is drawn into this tube at the installation site. This measure is superfluous for turning inside out or eversion, since, by the process of turning inside out, the originally inside-laying impregnated composite fiber material reaches the outside, but the process of turning inside out and the subsequent transport of the radiation sources through the tube turned inside out is not a measure that is easy to manage.

Especially difficult here is performing a uniform impregnation, especially when at least one of the upper surfaces of the composite fiber material is provided with a film. Thus it is generally handled such that the tube or liner has been finished being produced only at the installation site, by performing the impregnation at the installation site. With turning inside out or eversion, processes have even been used to impregnate the composite fiber material with the respective resin only at the site where the turning inside out occurs. This measure requires the availability of suitable devices and their operation at the installation site, so that it is necessary constantly to move devices around.

It is known from DE 22 40 153 C2 to surround an inner film tube with a length of a composite fiber material by folds, and the overlap point of the fiber material is guided continuously by a sewing device, so that a felt tube results that surrounds the film tube. This composite is then guided through two film rollers and the projecting edges of this outer film are welded to one another, resulting in a tube with an inner film and an outer film. This tube is at first still unimpregnated, a state designated hereafter as "dry." It is the declared object of this process to perform the impregnation first immediately before insertion into the sewer. For this purpose, the tube, continually moved downward, is guided directly by the sewer to be renovated between rollers arranged in several tiers, and the outer film tube is provided, at intervals above the uppermost pair of rollers, with openings or incisions in which nozzles are inserted, through which the resin is injected by pumps into the composite fiber material. The resin feed is thus performed in spots, so that there is a considerable problem of resin distribution in the composite fiber material, whose voids are filled with air. As soon as the resin nozzles reach the vicinity of the upper pair of rollers, they must be retracted and the openings must be glued individually, a process that is consequently expensive. The working in of the resin into the composite fiber material is performed here by the said numerous rollers, of which the bottom-most pair of rollers has the function of compression rollers, to meter the amount of resin. An unsolved problem here is the escape of amounts of air that are displaced during the impregnation process and that cannot escape because of the closed outer film but must flow through the entire composite up to the open end of the dry section of the tube.

From DE 35 46 417 A1, it is known to take a composite made of an inner film tube and an outer fiber tube, first impregnate it in an impregnating bath using rollers and then to surround it with an outer film tube that is pushed on like an accordion on a guide device, from which the outer film tube is withdrawn in proportion to the speed of the impregnated tube. But with such a process only very limited lengths of tube sections can be produced, and still the problem of sufficiently eliminating air inclusions in the composite fiber material is not solved, since the compression rollers in the impregnation bath constantly release air bubbles that, because of the viscosity of the resin, can escape only unsatisfactorily, so that constantly part of the air from the composite fiber material is carried along. Also the inclusion of air between the outer film tube and the already impregnated tube cannot be avoided. Also this known process is performed right at the installation site, so that the device must be further transported from renovation section to renovation section.

EP 0 301 204 A1 also discloses a process for the internal renovation of pipe conduits that is used right at the installation site. Here the impregnation is to be performed in a resin bath at 0.4 to 1 bar and with squeezing out. The vacuum here is to produce a height difference between the resin levels in two different containers. But it remains completely open as to what influence the vacuum could have on the process of impregnation, because the composite fiber material, which is also designated as a reinforcing layer, is enclosed between a tube-shaped inner film and a tube-shaped outer film, so that an impregnation through the tube surfaces is not possible, but if necessary from the tube ends.

Unpublished attempts have also already been made to fill the at first still open end of a fiber tube surrounded by only one outer film with a predetermined resin amount, to close the tube end and to convey the tube continually through the nip between two superposed crushing rollers which, to a certain extent, push the trapped resin amount in front of themselves, opposite the direction of movement of the tube. Here, by the insertion of vacuum lines into the dry section of the tube, most of the air is removed from the composite fiber material, but simultaneously the necessity arises of again pulling the vacuum lines out of the latter in proportion to the migration of the tube and of reliably closing the thus-formed leak points against the penetration of air and against the later escape of resin. But here arose the problem of a greatly varying migration of the resin in the lengthwise direction of the tube under the effect of the vacuum. Since the entry of dry parts of the tube into the nip had to be avoided at all costs, the speed of movement of the tube had to be matched to the smallest migration speed of the resin in the lengthwise direction of the tube, so that productivity consequently was low. The vacuum was also generated on the side of the nip on which the trapped resin amount was located, so that the nip had no evening-out effect on the migration speed of the resin in the evacuated section of the tube.

Thus the object of the invention is to indicate a process of the above-described type by which an extraordinarily even impregnation of the composite fiber material, generally free of air inclusions and with high production speed, is achieved.

The solution of the indicated object is achieved with the above-indicated process according to the invention by first inserting the still unimpregnated tube from below into the nip and evacuating air from the unimpregnated section of the tube, inserting liquid resin into the at first still open full opening of the tube and damming it up by the nip, and taking off the tube with an upward-oriented component from the nip at such a speed that the border between the impregnated and unimpregnated section of the tube is retained essentially in the area of the nip, and by finally taking off the tube through at least one further nip and collecting it on a transport device.

The following advantages are connected with the process according to the invention: The nip defines a so-called "impregnation line," i.e., the border between the dry or unimpregnated section of the tube and the impregnated section of the tube runs essentially linear and horizontal, because the compression of the tube in the nip prevents, at least to a large extent, a leakage of resin. The expression "in the area of the nip" does not imply that the so-called impregnation line now must lie at the narrowest point of the nip, rather deviations upward or downward are completely allowable. But it involves a stable adjustment of the impregnation line, and this adjustment is supported by the viscosity of the resin. The vacuum is located—viewed in the direction of transport of the tube—exclusively on this side of the nip, and the flat-lying tube is also compressed under the influence of atmospheric pressure. Practically air-free voids inside the composite fiber material enter the nip, voids that are filled extremely quickly by the resin since, on the other side of the nip, atmospheric pressure again prevails, which is transmitted through the tube to the resin, supporting the impregnation additionally by the geodetic pressure of the resin column.

The necessary pressure per unit area for air penetration inside the nip is determined by tests and can be set by horizontal adjustment of at least one of the rollers. Again stretching out the elastically compressed composite fiber material directly above the nip results in an extremely even impregnation of the composite fiber material with a practically complete lack of air inclusions in combination with an increased production speed.

The setting of the take-off speed to as high a value as possible can be determined visually or with measurement techniques: A penetration of resin into an area essentially below the narrowest point of the nip is clearly visible from the outside, so that the take-off speed can optionally be increased until the optimal conditions are again set. This makes it possible to have better quality control and quality assurance, since the impregnation area to be monitored is very small or narrow. The at least one additional nip is used to squeeze out excess resin and to convey the amount of resin dammed up by the nip. In this way, the pressure in the resin is also raised and an optimally impregnated tube is produced without any air inclusions.

But especially advantageous is the fact that, in this way, any amount of tubes can be produced and stored away from the installation site, as long as it is assured that the curing conditions cannot be introduced, i.e., the finished tube is protected against the influence of heat, light, and/or UV radiation. The necessary amounts of tube can thereupon be called up from storage on short notice and brought to the relevant installation site, so that no production device that must be further moved from renovation section to renovation section need be available at the installation site.

The transport device to collect the tube can be made in different ways: For example, the tube can be placed by an oscillation movement, meander-shaped, on a palette. But it is easily possible to wind the finished impregnated tube on a drum or roll and to bring it in this way to the installation site.

The process according to the invention also makes it possible to achieve an extremely advantageous further configuration, namely by using a tube with a gas-impermeable, flat, superposed inner layer and by damming up the liquid resin on both sides of this inner layer above the nip.

The presence of a flat, superposed, tube-shaped inner layer avoids the disadvantageous insertion of such an inner layer. The tube produced according to the invention can be inflated inside the renovation section of the pipe conduit together with the inner layer and can thereafter immediately be passed over by the radiation source for curing the resin. Thus the extremely labor-intensive and complicated inversion or turning inside out or eversion of the inner layer or the inner tube is eliminated.

Such a simplification was not possible with previously usual impregnation processes, because the inner layer or the inner tube prevented the impregnation. With the process according to the invention, the flat-lying inner layer "swims" to a certain extent in the dammed up amount of resin, i.e., it is surrounded by resin on all sides and does not impede the impregnation of the composite fiber material.

But above all, there are no air buffers between the inner layer and the impregnated composite fiber material, so that an inner surface of the composite fiber material is achieved that is completely smooth and free of air bubbles or cavities.

The said tube-shaped inner layer can be inserted either already at the producer of the dry tube or immediately before impregnation, when quick handling is necessary.

The inserted inner layer is protected against damage since it is no longer subjected to the rough activity at an installation site and to being turned inside out, which can be performed only by putting up with the formation of many folds. Further, the possibility is precluded that the processor of the tube damages the inner layer by improper handling and, for example, destroys it by too high a gas injection pressure. By eliminating a separate insertion of the tube-shaped inner layer, considerable time of up to 2 hours is saved at the installation site, so that the renovation costs can be reduced. This is especially advantageous for the strapped financial situation of the municipalities, since with the same expense, longer sewer lengths can be renovated.

The resin needed for the impregnation can be metered in from the beginning in its total amount, in portions or over a beginning lengthwise section, which will be described in more detail in connection with the embodiments.

Here it is in no way urgent, but it is especially advantageous, that the plane of symmetry of the nip or of the rollers be oriented perpendicular; rather a slant of the plane of symmetry of the nip is also conceivable, for example when the impregnated section of the tube, starting at the nip, is moved over at least one slanted plane.

Other advantageous configurations of the process according to the invention come out from the remaining process claims.

The invention also relates to a device for the production of a transportable, multilayer tube with a gas-impermeable outer layer and at least one layer impregnated with a curable resin and made of a composite fiber material to line pipe conduits and sewer systems, with a vacuum pump and rollers, between which there is at least one nip for the tube to pass through.

To achieve the same object, such a device is characterized according to the invention in that the at first still unimpregnated tube can be inserted into the nip from below, in that the vacuum pump is connected on this side of the nip to the unimpregnated section of the tube, in that a metering device for liquid resin is attached at the at first still open, full opening of the tube and in that the tube can be taken off upward out of the nip and can be placed on a transport device after impregnation with the liquid resin.

Such a device provides not only the conditions for the advantages of the process according to the invention, but is moreover simple, robust, maintenance-friendly and causes low investment and operating costs. It also requires only limited space, and practically all tube dimensions that arise with regard to cross section and length and wall thickness can be processed with one single device. It is possible, for example, to produce tubes for the renovation of pipe conduits with a standard diameter of up to 1,200 mm and higher on such a device.

In the context of another configuration of the device it is here especially advantageous if at least one of the rollers of the nip can be heated. This measure makes it possible for the resin in the nip to be heated and thus to lower its viscosity, so that the impregnation process can be further accelerated. A heating of the resin has proven to be especially advantageous when the resin is mixed with thixotropic agents. It must only be assured that the heating of the resin does not introduce any curing.

Other advantageous configurations of the device according to the invention come out from the remaining device claims.

Two embodiments of the object of the invention are described in more detail below based on FIGS. 1 to 4.

There are shown in:

FIG. 1, a vertical section through a tube with an inner layer in the area of the dammed up volume and side views of the rollers with the nip and a support and transport device in the form of a conveyor belt.

Figure 2:
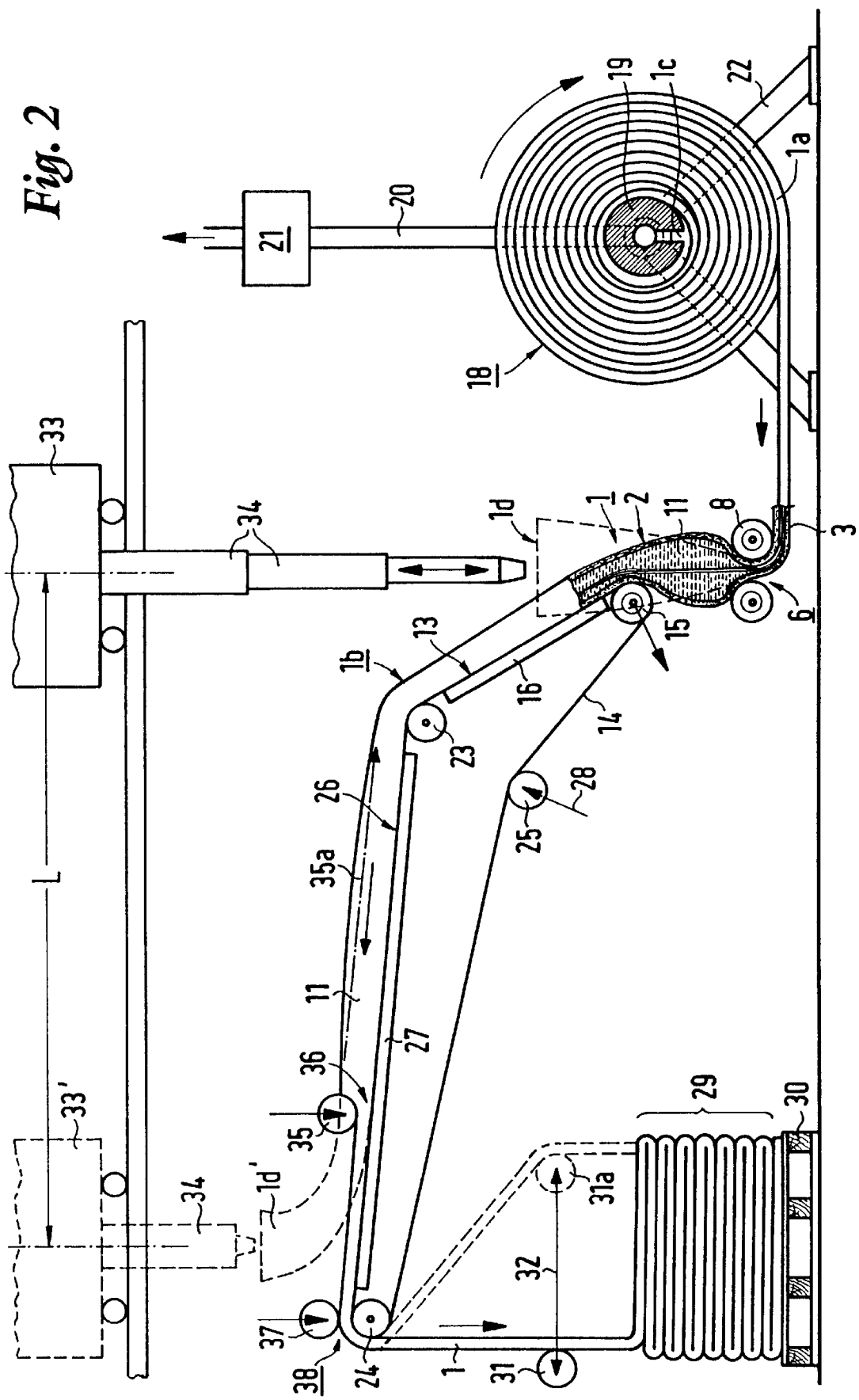
Figure 3:
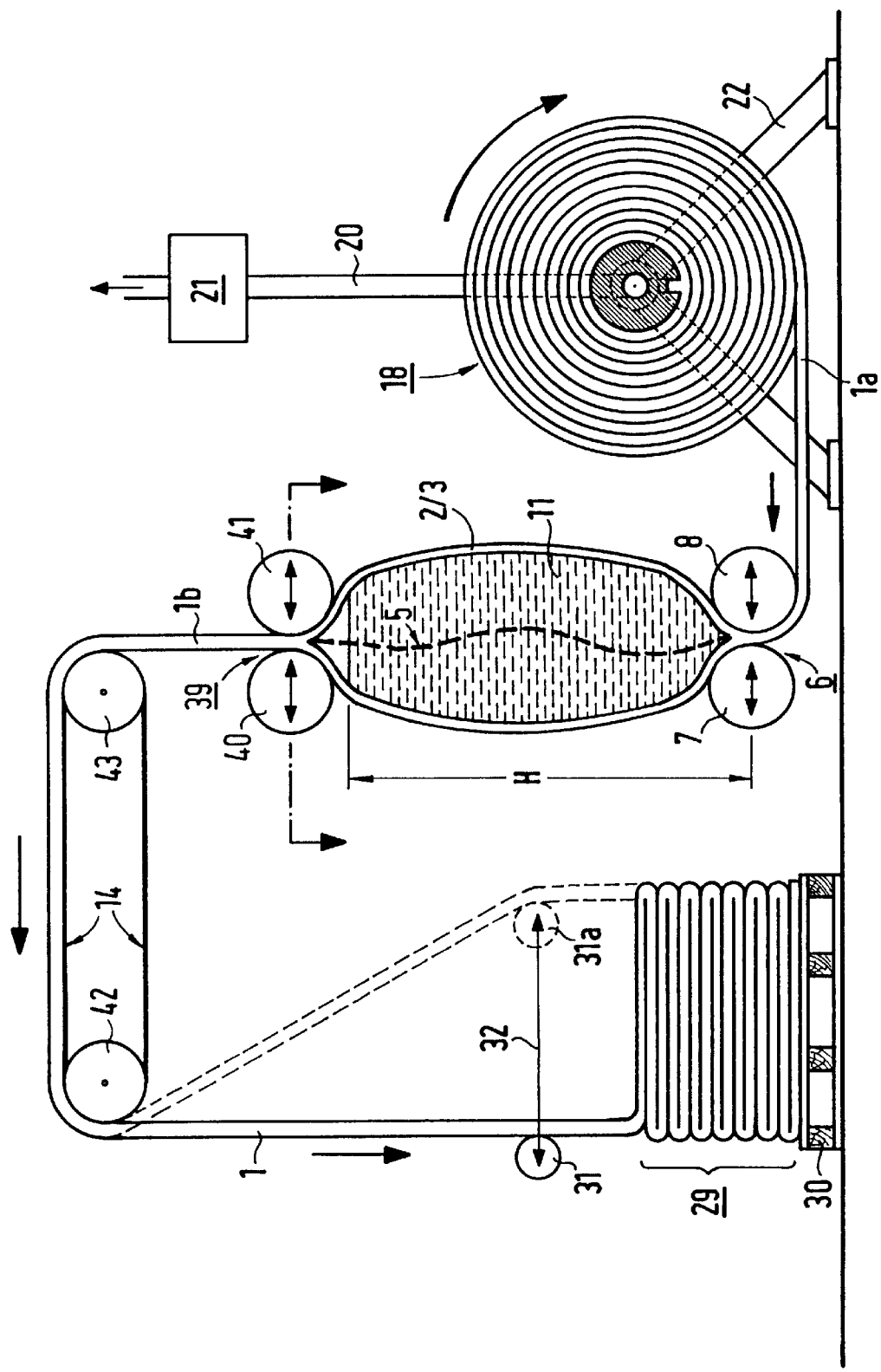
Figure 4:
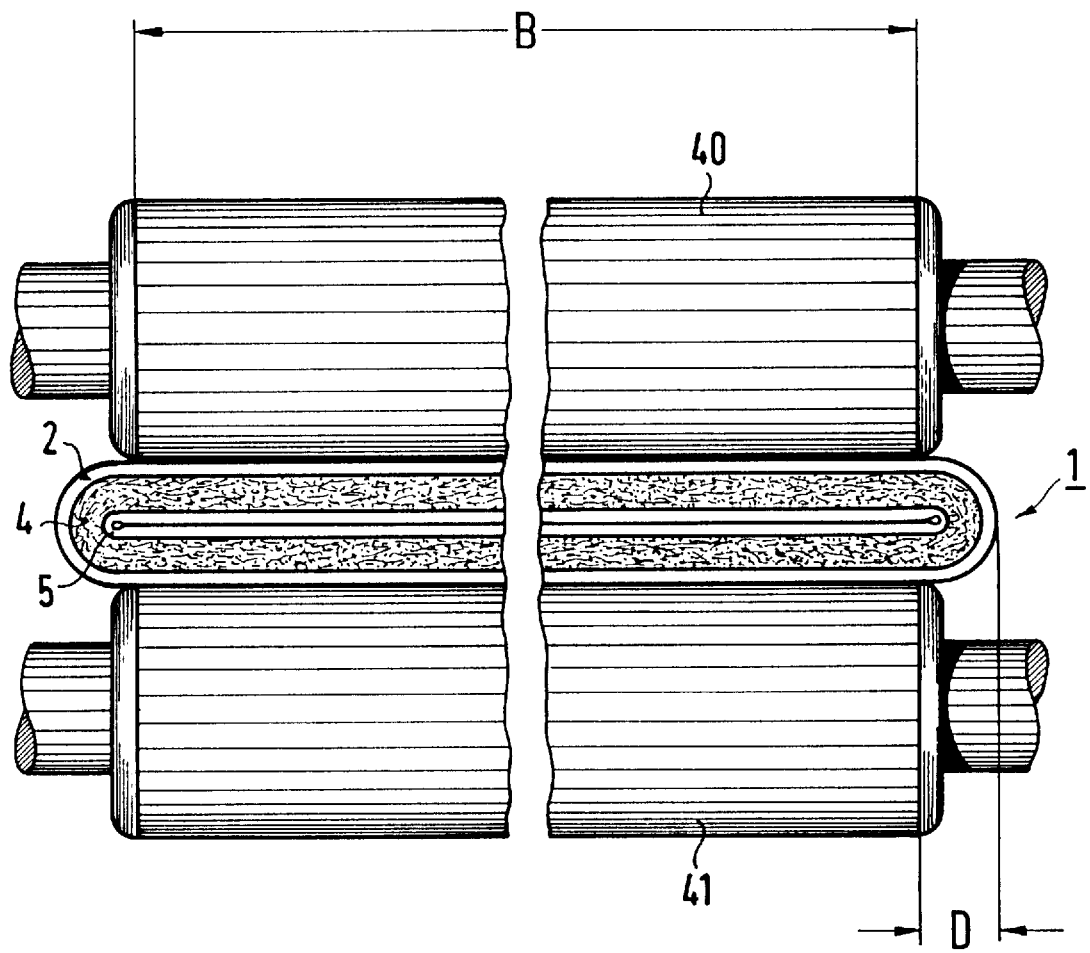

FIG. 2, a diagrammatic representation of a first embodiment of the object of the invention with the details from FIG. 1, FIG. 3, a diagrammatic representation of a second embodiment of the object of the invention and FIG. 4, a top view of two squeezing rollers and a cross section through the tube in the area of the narrowest point of the nip.

Based on FIG. 1, the gist of the invention is described in more detail.

A flat-lying tube 1, whose walls consist of three layers, namely a gas-impermeable outer later 2, an inner layer 3 made of a composite fiber material 4, and a gas-impermeable inner layer 5, is carried from the side and conveyed from below into a nip 6 that is formed between two cylindrical rollers 7 and 8. At least one of these rollers 7 and 8 is driven, and the axes of rotation of these rollers lie in a common horizontal plane E—E. Rollers 7 and 8 can be adjusted in this plane in the direction of both double arrows, so that the contact pressure of the rollers on tube 1 and thus the compression and the subsequent expansion of elastic composite fiber material 4 can be adjusted.

Tube 1 is evacuated according to arrow 10, opposite the transport direction of tube 1, which is indicated by an arrow 9. In this way, the absolute flat position of tube 1 shown in FIG. 1 is forced up until nip 6, and the effect of atmospheric pressure acts in a supporting way. Thus, up to nip 6, a total of six layers lie as closely to one another as possible, layers that consist of outer layer 2, composite fiber material 4 and inner layer 5. Outer layer 2 and inner layer 5 consist of film tubes that can also have, but do not have to have, seams. Composite fiber material 4 also has the shape of a tube that is closed on the periphery by one of the usual connection methods. The unimpregnated or "dry" section of the tube is designated by 1a, the impregnated section of the tube with 1b.

Then tube 1 gradually opens in the nip under the effect of the geodetic pressure of a curable liquid resin 11, which fills the dammed volume formed at this point. Here inner layer 5 remains superposed and flat, and it swims to a certain extent in liquid resin 11. This of course assumes that the liquid resin is brought into the space between composite fiber material 4 and inner layer 5. By the formation of the dammed volume, outer layer 2 and composite fiber material 4 undergo a corresponding crosswise contraction, so that inner layer 5 becomes slightly undulated crosswise to the direction of transport, which, however, is not disadvantageous to achieve the end object. As can be seen in FIG. 1, liquid resin 11 thus is given the possibility of being able to flow around inner layer 5, which was not possible in the known previous processes.

On the other side of nip 6 there is no longer a vacuum inside tube 1, but with the exception of the practically nonexistent inner space of inner layer 5. In this way, outer layer 2 and composite fiber material 4 hug the cylinder surfaces of rollers 7 and 8 about in the upper inner quadrant of nip 6, as represented in FIG. 1. To the extent that rollers 7 and 8 are heated, there results also a certain heat transfer through the tube into the liquid resin. Composite fiber material 4 is fully impregnated in any case with the liquid resin, in the briefest time, above plane E—E, in which the narrowest point of the nip lies.

According to FIG. 1, impregnated section 1b of tube 1 is taken off vertically upward, in any case with a vertical movement component, and the tube subsequently is supported on a slanted plane 13 that is formed by the upper end of a conveyor belt 14 that is guided around a guide roller 15. A support plate 16 is provided to support the upper end of conveyor belt 14. Impregnated section 1b of the tube is taken off in the direction of arrow 17.

The function of guide roller 15 can also be assumed by roller 7; in this case, conveyor belt 14 is guided around roller 7.

FIG. 2 shows the object of FIG. 1 on a greatly reduced scale. To the extent required, the same reference symbols were retained. Unimpregnated section 1a of tube 1 is kept on a supply roll 18, whose center is formed by a roll carrier 19 with a slit parallel to the axis, into which tube end 1c is inserted, vacuum-tight. A vacuum pump 21 is attached to roll carrier 19 by a suction line 20, and it suctions air out of unimpregnated section 1*a* of tube 1. Roll carrier 19 is mounted to pivot between two bearing blocks 22, of which only the rear one is represented.

Conveyor belt 14 is guided over three other guide rollers 23, 24, and 25, of which the end between guide rollers 23 and 24 defines another slanted plane 26. Another support plate 27 is used for support. Guide roller 25 is mounted in a clamping device 28, which is indicated by an arrow.

The tube can also be delivered folded in a meander shape. If the beginning evacuation time is to be reduced, it can be suitable to insert suction nozzles at intervals in front of the nip into the outer layer and again to close the insertion holes shortly in front of the nip.

On the other side of guide roller 24, now impregnated tube section 1*b* of tube 1 is guided downward and collected in the shape of a meander-shaped tube stack 29 on a transport device 30, which is made as a palette. The meander-shaped design of tube stack 29 is effected by a traversing roller 31 that can be moved back and forth in the direction of double arrow 32 between the retracted position represented and position 31*a* represented in dashed lines. The positioning and drive of the individual rollers are not shown in more detail; it is also not necessary to drive all the rollers.

At the beginning of the production process of a predetermined length of tube 1, tube beginning 1*d* is placed approximately vertically, as shown in dashed lines above nip 6. Above the opening at tube beginning 1*d* formed this way, there is a supply container 33 for liquid resin, which is fed, metered by a telescoping pipe 34, into the opened tube beginning. The required metering valve is not represented in the drawing. As soon as the composite fiber material above nip 6 is full, i.e., impregnated free of air, a kind of liquid closure forms inside the nip, up to which the effect of vacuum pump 21 is sufficient. After that, tube beginning 1*d*, while retaining its opening, is placed on slanted plane 13 and guided by guide roller 23 and second slanted plane 26 up to the vicinity of guide roller 24, and the opening in tube end 1*d*' continues to be oriented upward, as represented on the left in FIG. 2 in dashed lines. This movement of tube beginning 1*d* or 1*d*' is followed by supply container 33 with the liquid resin over a travel path L up to a position 33', which is represented in FIG. 2 on top on the left. Thereupon the resin feed, which can be performed continuously or in portions, is interrupted. Tube beginning 1*d*' is thereupon closed by an adhesive tape and pushed under another roller 35, which previously had been in a raised position. The latter is lowered into the position shown in FIG. 2, establishing another nip 36 with a squeezing out effect. Nip 36 can also be set to produce in the resin, in addition to the gradient, a pressure increase. Roller 35 can be adjusted in the direction of arrow 35*a*, to be able to follow the constantly reducing dammed volume of the resin. From this it can be seen that a nip does not necessarily have to be formed by two rollers, but can also be formed by one roller and a conveyor belt. Also above guide roller 24 there is another roller 37, which defines another nip 38 through which tube 1 is guided before it is placed on tube stack 29.

The dammed volume of resin 11 extends between nip 6 and nip 36. The amount of resin in this dammed volume corresponds to the amount of resin that is needed for the rest of the length of the tube and that is no longer supplemented after the closure of tube beginning 1*d*. The transport path of tube 1 between nip 6 and nip 36 is to be selected to be suitably long.

The height difference between nip 6 and nip 36 also determines the geodetic pressure above nip 6 and thus the efficiency of the impregnation. Of course, the inclinations of slanted planes 13 and 26 can be adjustable and adapted to the parameters of the impregnation process. In doing so, slanted plane 26 can also run at least approximately horizontal.

In the embodiment according to FIG. 3, impregnated section 1*b* of tube 1 is taken off vertically upward out of nip 6; otherwise, the process conditions and the device details are unchanged to a large extent. In this case, total resin amount 11 needed for the given tube length is put at one time into the tube beginning, which, however, is not represented in more detail here. Also in this case, double inner layer 5, indicated here only in dashed lines, "swims" inside the dammed volume, and impregnated section 1*b* of the tube is guided through another nip 39, which is formed between two other rollers 40 and 41. These rollers 40 and 41 can also be adjusted in the horizontal direction, to be able optimally to set the squeezing effect inside nip 39. Also in this case, impregnated and now flat-lying section 1*b* of tube 1 is moved by a conveyor belt 14 and placed in the already described way as a tube stack 29 on transport device 30. Conveyor belt 14 is guided here over two guide rollers 42 and 43. All rollers turn with the same peripheral speed, and optionally only some of the rollers must be driven. Also in this case, the roller bearings and the adjustment devices are not represented in more detail.

Rollers 40 and 41 can be adjustable in the vertical direction, optionally also only by their own weight in connection with vertical guide mechanisms, not shown. Thus rollers 40 and 41 are slaved to a certain extent to the shrinking dammed volume of the resin.

FIG. 4 shows flat-lying, impregnated tube 1 between two squeezing rollers, which can correspond to rollers 40 and 41 in FIG. 3. It can be seen that rollers 40 and 41 are rounded on their ends and have a working width B that is smaller than the width of flat-lying tube 1, specifically such that both lengthwise folds of tube 1 are not subjected to the contact pressure of rollers 40 and 41. This prevents an unreliable reduction of the impregnation or resin amount in the area of said lengthwise folds. The extent of projection D of the tube beyond working width B of rollers 40 and 41 corresponds here advantageously to at least double the wall thickness of the tube, and specifically including outer layer 2, composite fiber material 4 and inner layer 5.

I claim:

1. A process for the production of a transportable, multi-layer tube with a gas-impermeable outer layer and at least one layer impregnated with a curable resin and made of a composite fiber material for lining pipe conduits and sewer systems using subatmospheric pressure and rollers, between which rollers is formed at least one nip through which the tube passes, comprising the steps of:

guiding an unimpregnated section of the tube from below and into the one nip;

evacuating air from the unimpregnated section of tube;

supplying liquid resin into an open end of said tube on an opposite side of said nip from said unimpregnated section to impregnate another section of said tube;

damming the resin in the tube by the nip;

advancing the tube through the nip in a direction having an upward-oriented component at a speed such that a border between impregnated and unimpregnated sections of the tube is maintained substantially in the area of nip;

advancing the impregnated section of the tube through at least another nip; and collecting the impregnated tube on a storage device.

2. A process according to claim 1 wherein the tube has a gas-impermeable, flat, superposed inner layer and including the step of damming the liquid resin on both sides of said inner layer above the nip.

3. A process according to claim 1 including disposing an open end of the tube at a length from said nip sufficient to receive at least a portion of the resin, releasing additional resin into the tube through the open end, laying a leading portion of the tube flat and advancing the tube through at least said another nip.

4. A process according to claim 1 including maintaining the unimpregnated section of the tube on a supply roll with a roll carrier, and evacuating the unimpregnated tube section on the roll carrier.

5. A process according to claim 1 including advancing the tube through the nip while continuing evacuating the unimpregnated tube section.

6. A process according to claim 1 including advancing the impregnated section of tube, starting at the nip, over at least one inclined plane.

7. A process according to claim 1 including advancing the impregnated section of tube, starting at the nip, in a vertically upward direction.

\* \* \* \* \*